COATING OR PLASTIC. Cross Reference

506/74

UNITED STATES PATENT OFFICE.

433,129

WILLIAM SMITH LEA, OF HANLEY, COUNTY OF STAFFORD, ENGLAND.

PROCESS OF MANUFACTURING AND IN THE COMPOSITION OF REFRACTORY CEMENTS.

SPECIFICATION forming part of Letters Patent No. 433,129, dated July 29, 1890.

Application filed November 18, 1889. Serial No. 330,756. (No specimens.) Patented in England April 6, 1899, No. 5,919.

*To all whom it may concern:*

Be it known that I, WILLIAM SMITH LEA, a subject of the Queen of Great Britain and Ireland, residing at Hanley, in the county of Stafford, England, have invented new and useful Improvements in the Process of Manufacturing and in the Composition of Refractory Cements, to be used as a lining for furnaces, kilns, ovens, crucibles, retorts, and other vessels exposed to intense heat or to the action of acid fumes, (for which I have applied for Letters Patent in Great Britain, No. 5,919, dated April 6, 1889,) of which the following is a specification.

My improved cement or compound is manufactured from the following substances in or about in the under-mentioned proportions: Disintegrated granite, or other rock or rocks whose chemical composition is chiefly that of silicate of alumina and potash, as syenite and other granitic rocks, fifty to sixty-five per cent.; blast-furnace slag or basic-steel slag, glass, earthenware, and other substances whose chemical composition is chiefly a compound silicate of alumina and potash, or soda, borax, or of other alkalies, five to fifteen per cent.; hydrated silicates of alumina and magnesia—such as clay, kaolin, steatite, or other refractory clays—fifteen per cent.; silica, as sand, loam, silicious ocher, five per cent.; phosphate of lime, five per cent.; salt, two per cent.; carbonate of lime, two per cent., and caustic potash, one per cent. To these may be added small quantities of manganese, as oxide, silicate of soda, and sulphate and carbonate of soda.

The above proportions are such as I have found to answer well in practice; but it will be evident that they may be varied somewhat— as, for example, if a smaller percentage of granite or granitic rock is used the smaller percentage of silicate of alumina and potash therefrom may be compensated for by an addition to the percentage of caustic potash and of the materials forming the hydrated silicates, and the smaller percentage of quartz obtained from the granite may be compensated for by the addition of sand or silicious ocher and refractory oxides.

The granite or other granitic rock first above referred to is subjected to a suitable temperature in a kiln or furnace, and while at this temperature, or it may be at different temperatures, it is exposed to the fumes or vapors of nitric and hydrochloric acids, the fumes being introduced by means of an injector or other convenient apparatus. The temperature required for this part of the operation cannot be accurately given; but I have found that with a temperature of 240° Fahrenheit outside of the kiln or oven a suitable temperature is obtained in the interior. This treatment disintegrates the granite, separating out the quartz and decomposes the feldspar and mica. The steatite and the blast-furnace or basic-steel slag are treated in a similar manner, with the exception that it is advisable first to calcine and grind the slag, and then to wash it in order to remove the sulphur. The disintegrated and decomposed material is next reduced by grinding to a powder, and after or during the grinding operation it is mixed with the silica and sand, or silicious ocher, loam, phosphate, and carbonate of lime, caustic potash, or borax, and manganese approximately in the proportions above stated. This mixture is then again ground up to a finer powder, with the addition of silicate of soda and salt, (chloride of sodium.) The addition may be made in the dry state, as crystals or powder, or in solutions, or by dissolving in boiling water; also, potassic silicate and chloride may be used instead of sodic silicate and chloride when the cost of the latter will allow this, or suitable quantities of highly-silicious (*i. e.*, difficultly fusible) glass may be employed.

For the purpose of storage it is preferable to kiln-dry the mixture before the addition of the salt, sodic silicate, caustic, potash, or borax, phosphate and carbonate of lime, and manganese, and only to add these immediately before use.

The above mixture, with the addition of salt and sodic silicate, is ground up with clean water until it is of the consistency of plaster. It is then ready for use, and is applied by plastering it over the bricks or walls of the furnace, kiln, or other place (afterward referred to as "kiln" or "furnace") to which it is to be applied by means of a trowel or other suitable tool. It is best to put on a thin coating only at first, afterward thicker coatings, the kiln or furnace being fired after each successive coat is applied. For general purposes the thickness of the coating is conveniently from one-fourth inch to one-half inch thick; but the thickness may be varied according to the purpose for which the kiln or furnace is afterward to be used and the more or less refractory character of the bricks or backing to which it is applied. In some cases—as, for instance, in covering the roof of a kiln or furnace—it may suffice to lay on the cement (then mixed to a thinner consistency) by means of a brush, as in whitewashing.

The addition of oil (preferably boiled linseed-oil) to the cement, though not necessary, greatly facilitates the reactions which take place when the lining is fired, and assists in increasing or maintaining the large quantity of uncombined silicate of alumina—i. e., a simple silicate of alumina and not a compound silicate of alumina and of some alkali or alkalies, or base or bases.

The object of my invention, as above described, is to produce a highly-refractory cement composed for the most part of a simple (i. e., uncombined) silicate of alumina, which will stand great and rapid changes of temperature without the risk of splitting or flying or of losing its coherence. The subjection of the granite, slag, &c., as above described, to acid fumes serves not only to disintegrate the granite, but is so regulated as to neutralize the alkaline or basic action of the other constituents, or, rather, the affinity of the silicic acid for the alkalies and the earthy bases. The regulation of the temperature at this stage is of importance, since the action of silicic acid becomes rapidly stronger with the increase of temperature, while its action at low temperatures is comparatively feebler than that of hydrochloric and nitric acid. It is the object at this part of the process especially to prevent the premature fusion of the materials, which would form a glassy or vitreous compound. By avoiding too high a temperature at this stage the mass is kept, so to say, in a devitrified condition, thereby favoring the formation during the subsequent firing of the cement of a larger proportion of uncombined or simple silicate of alumina, rather than that of compound silicates of alumina and earthy or alkaline bases.

I am aware that some of the substances I employ have before been used in the manufacture of cement; but I am not aware that all the essential constituents of my cement have been previously used together in the proportions specified nor subjected to the same treatment.

What I claim, and desire to secure by Letters of the United States, is—

1. The herein-described method of manufacturing refractory cements, which consists of the following steps, to wit: disintegrating materials whose chemical composition is chiefly that of a compound silicate of alumina and of alkalies and earthy bases mixed with quartz by subjecting the same to the simultaneous action of heat and of the vapors of nitric and hydrochloric acids, reducing the disintegrated materials and mixing therewith silicious materials and materials whose composition is chiefly hydrated silicate of alumina, together with calcium phosphate and carbonate, caustic potash, and manganese, again reducing the compound and mixing therewith sodium chloride and an alkali silicate, as set forth.

2. As a step in the above process, the mode of disintegrating highly-aluminous silicates, which consists in subjecting the same to the simultaneous action of heat and of the vapors of nitric and hydrochloric acids, for the purpose specified.

3. As a step in the above-described process, the mode of disintegrating the materials whose composition is chiefly that of a compound silicate of alumina and alkalies and earthy bases mixed with quartz, which consists in first calcining the same, grinding the calcined material, and subjecting the ground material to the action of the vapors of nitric and hydrochloric acids, for the purpose specified.

4. A refractory cement composed of materials whose chemical composition is chiefly that of silicates of alumina and potash mixed with free silica, of compound silicates of alumina and of the alkali metals and furnace-slags, of hydrated silicates of alumina and magnesia, of silica, of phosphate and carbonate of lime, of caustic potash, and of sodium chloride, in or about in the proportions specified.

5. A refractory cement composed of materials whose chemical composition is chiefly that of silicates of alumina and potash mixed with free silica, of compound silicates of alumina and of the alkali metals and furnace-slags, of hydrated silicates of alumina and magnesia, of silica, of phosphate and carbonate of lime, of caustic potash and of sodium chloride, together with oxide of manganese, sulphate, carbonate, and silicate of soda, in or about in the proportions specified.

WILLIAM SMITH LEA.

Witnesses:
R. M. GORDON DILL,
    *Barrister-at-Law.*
MUMFORD HALLEN,
    *Hosier, &c.*